US012614123B2

(12) United States Patent
Tian et al.

(10) Patent No.: US 12,614,123 B2
(45) Date of Patent: Apr. 28, 2026

(54) REAL-TIME ENSEMBLE EVALUATION

(71) Applicant: International Business Machines Corporation, Armonk, NY (US)

(72) Inventors: Lei Tian, Xian (CN); Han Zhang, Xian (CN); Si Er Han, Xian (CN); Jun Qi Zhang, Xian (CN); Dong Hai Yu, Xian (CN); Xiao Ming Ma, Xian (CN)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 18/153,220

(22) Filed: Jan. 11, 2023

(65) Prior Publication Data

US 2024/0232726 A1      Jul. 11, 2024

(51) Int. Cl.
*G06N 20/20*             (2019.01)
(52) U.S. Cl.
CPC .................................... *G06N 20/20* (2019.01)
(58) Field of Classification Search
CPC ...................................................... G06N 20/20
USPC ........................................................... 706/12
See application file for complete search history.

(56) References Cited

U.S. PATENT DOCUMENTS

| | | | |
|---|---|---|---|
| 2005/0278322 A1 | 12/2005 | Fan | |
| 2010/0076917 A1* | 3/2010 | Petit ........................ | G16H 50/20 |
| | | | 706/46 |
| 2019/0171428 A1 | 6/2019 | Patton | |
| 2020/0012948 A1 | 1/2020 | Tian | |
| 2020/0372307 A1 | 11/2020 | Arun | |
| 2022/0027797 A1 | 1/2022 | Tian | |

FOREIGN PATENT DOCUMENTS

| | | |
|---|---|---|
| CN | 113298104 A | 8/2021 |
| WO | 2019002603 A1 | 1/2019 |

OTHER PUBLICATIONS

Gomes, et al., "A survey on ensemble learning for data stream classification", ACM computing surveys, vol. 50, No. 2, Article 23, Mar. 2017 (Year: 2017).*
Sun, et al., "Online ensemble learning of data streams with gradually evolved classes", IEEE Transactions on knowledge and data engineering, vol. 28, No. 6, Jun. 2016 (Year: 2016).*

(Continued)

*Primary Examiner* — Tsu-Chang Lee
(74) *Attorney, Agent, or Firm* — Harrity & Harrity, LLP

(57) ABSTRACT

One or more computer processors create a respective coincidence matrix for each component model of a deployed ensemble model. The one or more computer processors generate evaluation measures for each component model comprised in the deployed ensemble model. The one or more computer processors responsive to the respective coincidence matrix failing to exceed a record threshold, update the respective coincidence matrix with the generated evaluation measures. The one or more computer processors responsive to the respective updated coincidence matrix failing to exceed a disable cut point, flag the respective component model. The one or more computer processors responsive to the coincidence matrix associated with the flagged component model not exceeding an elimination cut point, remove the respective component model from the deployed ensemble model.

20 Claims, 4 Drawing Sheets

(56)                  References Cited

OTHER PUBLICATIONS

Abbasi, et al., "ElStream: An ensemble learning approach for concept drift detection in dynamic social big data stream learning", IEEE Access, vol. 9, 2021 (Year: 2021).*

"Continuous machine learning (SPSS Modeler)," IBM Cloud Pak for Data, printed: Aug. 25, 2022, 12 pages, <https://dataplatform.cloud.ibm.com/docs/content/wsd/nodes/caml.html>.

Bifet et al., "New Ensemble Methods for Evolving Data Streams", KDD'09, Jun. 28-Jul. 1, 2009, Paris, France. Copyright 2009 ACM, 978-1-60558-495-9/09/06, 9 pages.

Brzezinski et al., "Reacting to Different Types of Concept Drift: The Accuracy Updated Ensemble Algorithm", IEEE Transactions on Neural Networks and Learning Systems, Copyright (c) 2013 IEEE, 14 pages, <http://dx.doi.org/10.1109/TNNLS.2013.2251352>.

Masud et al., "A Multi-partition Multi-chunk Ensemble Technique to Classify Concept-Drifting Data Streams", PAKDD 2009, © Springer-Verlag Berlin Heidelberg 2009, 13 pages.

Patruno, Luigi, "The Ultimate Guide to Model Retraining" ML in Production, Jun. 10, 2019, 11 pages, <https://mlinproduction.com/model-retraining/>.

Sarnovsky et al., "Classification of the drifting data streams using heterogeneous diversified dynamic class-weighted ensemble," PeerJ Computer Science, Apr. 2021, pp. 1-31, <https://www.researchgate.net/publication/350545183>.

Wang et al., "Mining concept-drifting data streams using ensemble classifiers", Copyright 2002, 10 pages.

Wen et al., "Batchensemble: An Alternative Approach to Efficient Ensemble and Lifelong Learning", Published as a conference paper at ICLR 2020, 19 pages.

* cited by examiner

100

300

⊟— Comparing $C-Cholesterol with Cholesterol

| Correct | 158 | 79% |
|---------|-----|-----|
| Wrong | 42 | 21% |
| Total | 200 | |

⊟— Coincidence Matrix for $C-Cholesterol (rows show actuals)

| | HIGH | NORMAL |
|--------|------|--------|
| HIGH | 96 | 7 |
| NORMAL | 35 | 35 |

⊟·· Comparing $C-Cholesterol with Cholesterol

| Correct | 158 | 79% |
|---------|-----|-----|
| Wrong | 42 | 21% |
| Total | 200 | |

⊟·· Coincidence Matrix for $C-Cholesterol (rows show actuals)

| | HIGH | NORMAL |
|--------|------|--------|
| HIGH | 104 | 8 |
| NORMAL | 35 | 63 |

| | HIGH(False) | NORMAL(True) |
|---|---|---|
| HIGH (Negative) | 96 - 10*96/200 + 8 | 7 - 10*96/200 + 1 |
| NORMAL (Positive) | 35 - 10*35/200 + 0 | 62 - 10*62/200 + 1 |

| | HIGH(False) | NORMAL(True) |
|---|---|---|
| HIGH (Negative) | 144 *200/300 | 12 *200/300 |
| NORMAL (Positive) | 51 *200/300 | 93 *200/300 |

REAL-TIME ENSEMBLE EVALUATION

BACKGROUND

The present invention relates generally to the field of machine learning, and more particularly to mitigating model drift.

Machine learning models are susceptible to model drift, where existing models become increasingly ineffective (i.e., model accuracy reductions) due to data changes over time as new data is incorporated. Traditional systems deploy one or more models and retrain said models once new data deviates (i.e., drifts) from the original training set, although detecting and determining drift is complex and computationally expensive for many problem domains. For example, a financial forecasting model that predicts next quarterly revenue cannot retrain until the fiscal quarter passes and actual revenue is observed and transformed into associated labels/predictions. Models that cannot dynamically incorporate new data become outdated and fail to generalize future data, decreasing the overall effectiveness of the models and the system as a whole. Traditionally, as new data is incorporated into new, retrained, models, said models degrade (i.e., drift) due to the removal of relevant data in previous models, affecting the performance of the ensemble. To avoid this drift, systems perform general classifier evaluation measures to evaluate model performance corresponding to a specific historical period, but within the historical period evaluation measures are static, (i.e., insensitive to real-time status and conditions), and highly influenced by hyperparameters. This insensitivity to real-time events decreases ensemble/model accuracy and generalizability.

Ensemble modeling is a process where a plurality of multiple diverse models is created and trained to predict an outcome. Ensemble modeling utilizes different modeling algorithms and/or using different training sets then aggregates the prediction of each included model resulting in a final prediction for new data. Ensemble model drift occurs when the statistical properties of a target variable, which the model is trying to predict, change over time in unforeseen ways causing predictions to become less accurate.

SUMMARY

A first aspect of the present invention discloses a method comprising creating, by one or more computer processors, a respective coincidence matrix for each component model of a deployed ensemble model; generating, by one or more computer processors, evaluation measures for each component model comprised in the deployed ensemble model; responsive to the respective coincidence matrix failing to exceed a record threshold, updating, by one or more computer processors, the respective coincidence matrix with the generated evaluation measures; responsive to the respective updated coincidence matrix failing to exceed a disable cut point, flagging, by one or more computer processors, the respective component model; and responsive to the coincidence matrix associated with the flagged component model not exceeding an elimination cut point, removing, by one or more computer processors, the respective component model from the deployed ensemble model. Additionally, the computer-implemented method comprises responsive to the respective coincidence matrix exceeding the record threshold, adjusting, by one or more computer processors, the respective coincidence matrix by a calculated coincidence ratio. In this manner embodiments of the present invention enable increase model accuracy and generalizability through dynamically creating and maintaining coincidence matrices responsive to real-time model evaluations.

A second aspect of the present invention discloses a computer program product including one or more computer readable storage device and program instructions stored on the one or more computer readable storage device. The stored program instructions include program instructions to create a respective coincidence matrix for each component model of a deployed ensemble model; generate evaluation measures for each component model comprised in the deployed ensemble model; responsive to the respective coincidence matrix failing to exceed a record threshold, update the respective coincidence matrix with the generated evaluation measures; responsive to the respective updated coincidence matrix failing to exceed a disable cut point, flag the respective component model; and responsive to the coincidence matrix associated with the flagged component model not exceeding an elimination cut point, remove the respective component model from the deployed ensemble model. Additionally, the stored program instructions include program instructions to responsive to the respective coincidence matrix exceeding the record threshold, adjust the respective coincidence matrix by a calculated coincidence ratio. In this manner embodiments of the present invention enable increase model accuracy and generalizability through dynamically creating and maintaining coincidence matrices responsive to real-time model evaluations.

A third aspect of the present invention discloses a computer system including one or more computer processors and one or more computer readable storage device, where the program instructions are stored on the one or more computer readable storage device for execution by at least one of the one or more computer processors. The stored program instructions include program instructions to create a respective coincidence matrix for each component model of a deployed ensemble model; generate evaluation measures for each component model comprised in the deployed ensemble model; responsive to the respective coincidence matrix failing to exceed a record threshold, update the respective coincidence matrix with the generated evaluation measures; responsive to the respective updated coincidence matrix failing to exceed a disable cut point, flag the respective component model; and responsive to the coincidence matrix associated with the flagged component model not exceeding an elimination cut point, remove the respective component model from the deployed ensemble model. Additionally, the stored program instructions include program instructions to responsive to the respective coincidence matrix exceeding the record threshold, adjust the respective coincidence matrix by a calculated coincidence ratio. In this manner embodiments of the present invention enable increase model accuracy and generalizability through dynamically creating and maintaining coincidence matrices responsive to real-time model evaluations.

DETAILED DESCRIPTION

Embodiments of the present invention increase model accuracy and generalizability through dynamically creating and maintaining coincidence matrices responsive to real-time model evaluations. Embodiments of the present invention utilize the maintained coincidence matrices to consider historical model performance while retaining real-time sensitivity. Embodiments of the present invention maintain coincidence matrices utilizing a record reduction mechanism corresponding to a number of records in a coincidence matrix and an associated threshold or upper limit of records. Implementation of embodiments of the invention may take a variety of forms, and exemplary implementation details are discussed subsequently with reference to the Figures.

Embodiments of the present invention improve the art and solve at least the particular issues stated above by (i) maintaining coincidence matrices to consider historical model performance while retaining real-time sensitivity, (ii) responsive to the respective updated coincidence matrix not exceeding a disable cut point, flagging the respective component model, and (iii) responsive to the coincidence matrix associated with the flagged component model failing to exceed an elimination cut point, removing the respective component model. Therefore, embodiments of the present invention are advantageous because they provide the ability to maintain ensemble models in real-time while retaining model accuracy.

The present invention will now be described in detail with reference to the Figures.

Figure 1:
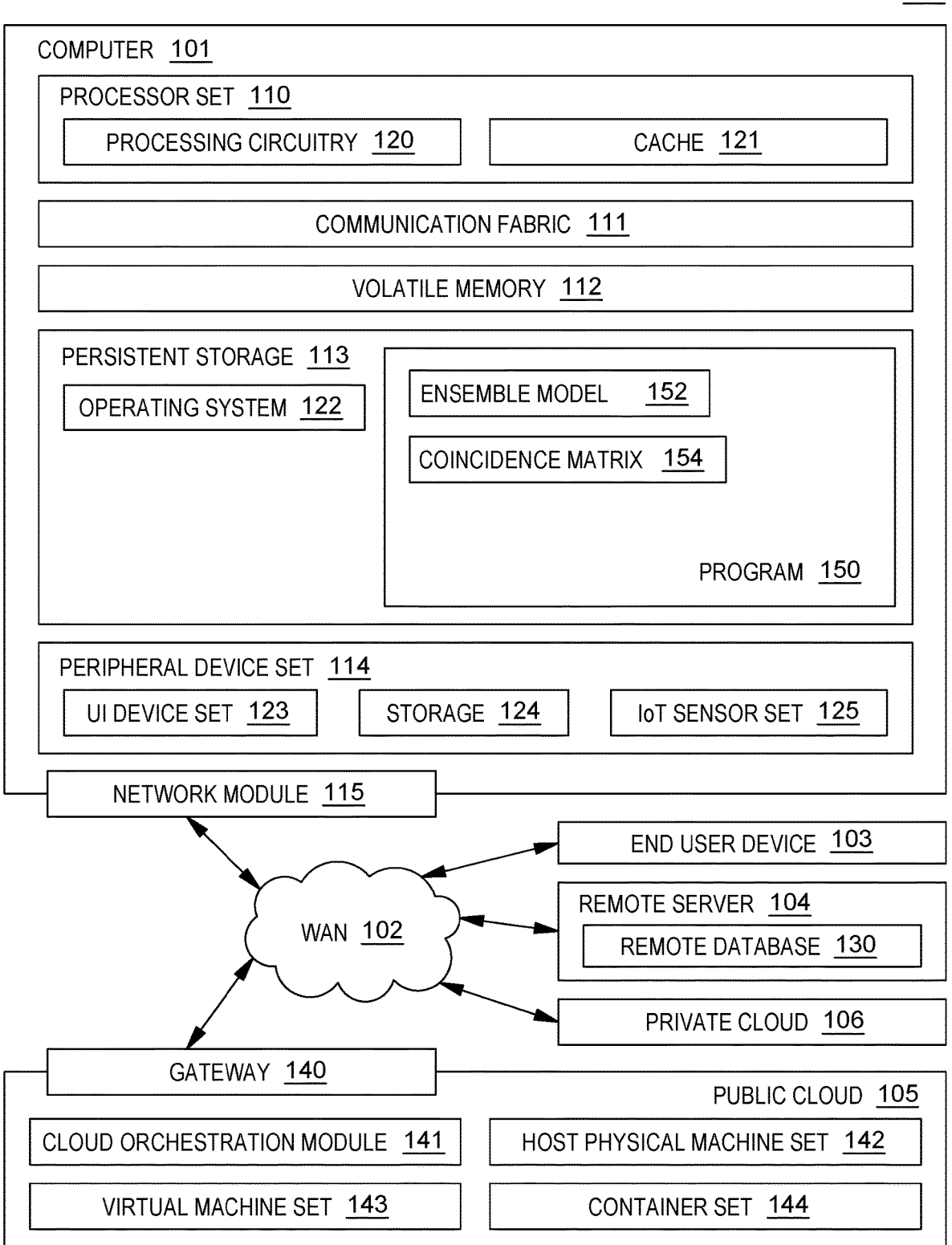
FIG. 1 is a functional block diagram illustrating a computing environment, in accordance with an embodiment of the present invention.

FIG. 1 depicts computing environment 100 illustrating components of computer 101 in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation, or garbage collection, but this does not render the storage device as transitory because the data is not transitory while it is stored.

Computing environment 100 contains an example of an environment for the execution of at least some of the computer code involved in performing the inventive methods, such as program 150 for. In addition to program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 4. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip". In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in program 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing exceptionally large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Program 150 is a program, a subprogram of a larger program, an application, a plurality of applications, or mobile application software, which functions to mitigate ensemble model drift with real-time evaluations. In various embodiments, program 150 may implement the following steps: create a respective coincidence matrix for each component model of a deployed ensemble model; generate evaluation measures for each component model comprised in the deployed ensemble model; responsive to the respective coincidence matrix failing to exceed a record threshold, update the respective coincidence matrix with the generated evaluation measures; responsive to the respective updated coincidence matrix failing to exceed a disable cut point, flag the respective component model; and responsive to the coincidence matrix associated with the flagged component model not exceeding an elimination cut point, remove the respective component model from the deployed ensemble model. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over WAN 102. In various embodiments, client versions of program 150 resides on any other computing device (not depicted) within computing environment 100. In the depicted embodiment, program 150 includes ensemble model 152 and coincidence matrix 154. Program 150 is depicted and described in further detail with respect to FIG. 2.

Ensemble model (EM) 152 is representative of a model that combines a plurality of component models, where each component model utilizes a different machine learning technique, model type, algorithm, and/or training set. In an embodiment, EM 152 contains a list of N component models, where each contained component model has one or more associated weights, where larger weights denote a larger influence on a final ensemble prediction score. In an embodiment, EM 152 is comprised of any combination of deep learning model, technique, and algorithm (e.g., decision trees, Naive Bayes classification, support vector machines for classification problems, random forest for classification and regression, linear regression, least squares regression, logistic regression). In an embodiment, EM 152 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. The training of EM 152 is depicted and described in further detail with respect to FIG. 2.

Coincidence matrix (CM) 154 is a data structure or table tracking a pattern of matches between a predicted field and a target field for a plurality of categorical targets (i.e., flag, nominal, or ordinal) for one or more associated models or component models. Coincidence matrix 154 is comprised of rows defined by actual values and columns defined by predicted values, with the number of records corresponding to a specific pattern in each cell. In an embodiment, program 150 maintains an instance of CM 154 for each component model within EM 152. In an embodiment, program 150 utilizes CM 154 to identify systematic errors within component models, in real-time.

The present invention may contain various accessible data sources that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

Figure 2:
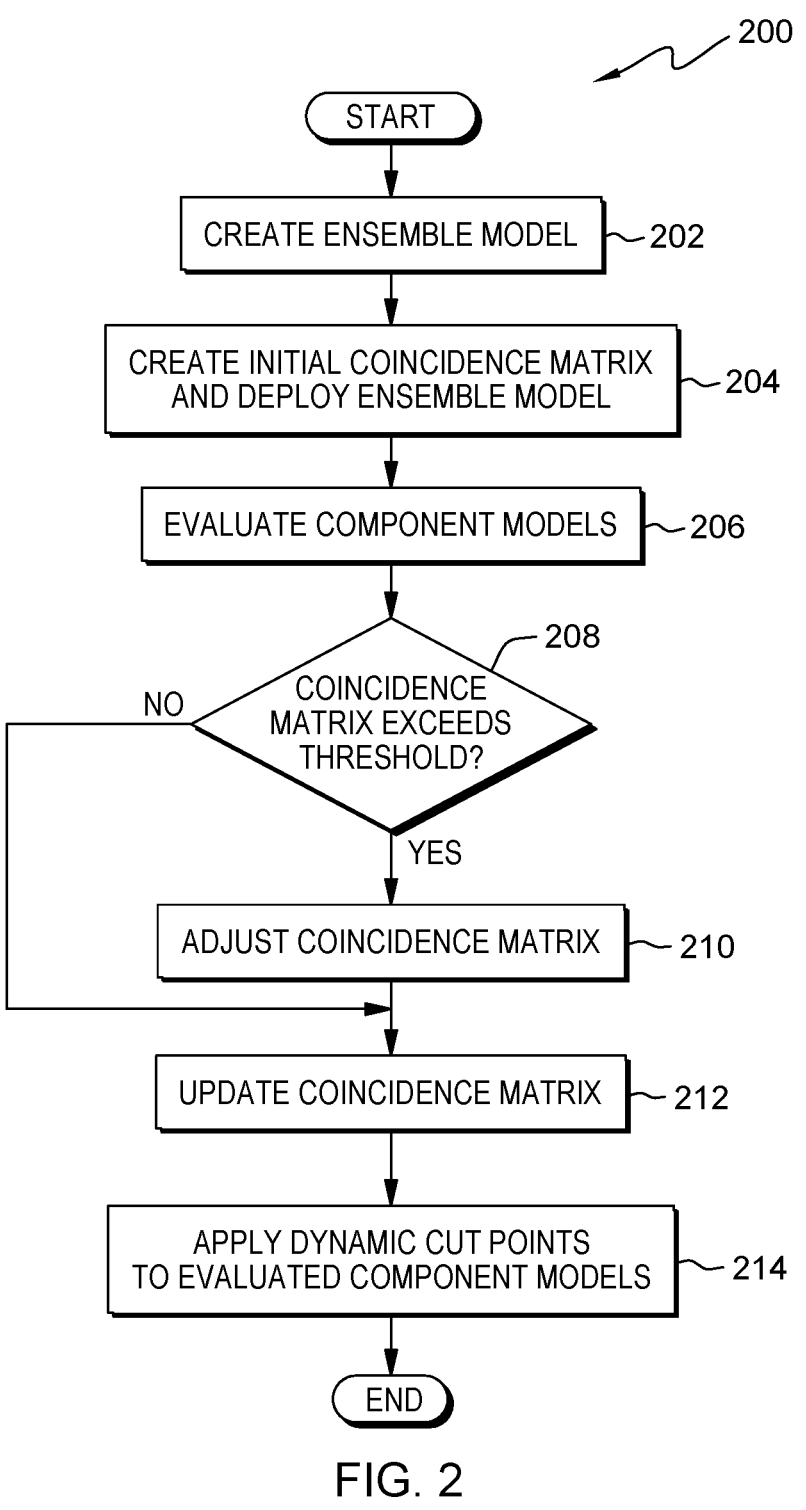
FIG. 2 is a flowchart depicting operational steps of a program, on a computer within the computing environment of FIG. 1, for mitigating ensemble model drift with real-time evaluations, in accordance with an embodiment of the present invention.

FIG. 2 depicts flowchart 200 illustrating operational steps of program 150 for mitigating ensemble model drift with real-time evaluations, in accordance with an embodiment of the present invention.

Program 150 creates an ensemble model (step 202). In an embodiment, program 150 initiates responsive to a request for the creation of EM 152. In another embodiment, program 150 initiates responsive to the utilization of EM 152 and the output of one or more evaluation measures. In an embodiment, program 150 creates EM 152 comprising one or more component models. In this embodiment, program 150 creates EM 152 containing N component models, where each contained component model is trained utilizing a distinct algorithm, technique, and/or data chunk partition contained in a training set. Program 150 trains each component model in EM 152 with a corresponding data chunk partition (i.e., set). For example, program 150 utilizes a specific data chunk partition, wherein data chunks are partitioned by time, to create and train a component model within the ensemble of EM 152.

Program 150 creates an initial coincidence matrix and deploys the ensemble model (step 204). Program 150 creates a respective CM 154 associated with each component within EM 152. In an embodiment, program 150 initiates CM 154 with all zero or null values until EM 152 (i.e., ensemble of component models or classifiers) is deployed, utilized, and evaluated. In another embodiment, program 150 initiates CM 154 with values from similar ensemble models or one or more component models. Responsive to created and initialized CM 154, program 150 deploys EM 152 to a plurality of production environments or respective production, test, or auxiliary environments. In another embodiment, program 150 determines which environment to deploy EM 152 from a plurality of deployment environments (e.g., test, production, backup server, containers, or virtual machines) based on characteristics identified within CM 154.

Program 150 evaluates component models (step 206). As deployed EM 152 is utilized (i.e., generating predictions responsive to new data or data points), program 150 continuously generates evaluations (e.g., accuracy, precision, sensitivity, and specificity) corresponding to one or more components models comprised within EM 152 and associated predictions or classifications in real-time, further detailed in step 214. For example, as EM 152 ingests data corresponding to real-time car engine performance, program 150 captures the predictions generated from each component model. In an embodiment, program 150 provides an interface for one or more users to flexibly control whether CM 154, associated with deployed EM 152, is updated during model evaluation. Here, when the interface or switch is turned off, real-time evaluation measures will not change during model evaluation.

Figures 4A, 4B:
FIGS. 4A and 4B are coincidence matrix adjustment tables, in accordance with an embodiment of the present invention.

If the coincidence matrix has exceeded a threshold ("yes" branch, decision block 208), then program 150 adjusts the coincidence matrix (step 210). Responsive to CM 154 exceeding the threshold, program 150 considers a number of records of new, incoming evaluations along with an existing number of records comprised within CM 154, while reducing the existing records by a calculated coincidence matrix ratio to ensure that the threshold (i.e., upper limit constraint) is satisfied. FIG. 4A further illustrates this embodiment. Responsive to CM 154 exceeding the threshold before incoming new data and evaluations arrive, program 150 reduces existing records comprised within CM 154 to allow the new data and evaluations while satisfying the threshold. This embodiment is further illustrated in FIG. 4B. In another embodiment, the threshold is a floating time window, requiring incoming evaluations to correspond to a specific timeframe (e.g., daily, etc.). For example, a floating time window may correspond to a day or 24-hour time window. In this embodiment, any evaluation outside the window is removed, not considered, or not stored within CM 154.

If the coincidence matrix has not exceeded a threshold ("no" branch, decision block 208), then program 150 updates the coincidence matrix (step 212). Program 150 monitors and verifies the number of evaluation records contained in CM 154. Program 150 maintains CM 154 to control associated model sensitivity, where sensitivity declines as the number of stored records grows. In an embodiment, program 150 defines and adjusts a threshold (e.g., record threshold) as an upper limit on total records allowed within a respective CM 154. In an embodiment, the threshold is predetermined by a user or determined by computational specifications (i.e., model storage requirements, model memory requirements, etc.) associated with a system maintaining CM 154. In an embodiment, if CM 154 has not exceeded (i.e., fail to exceed) the record threshold, then program 150 updates CM 154. In step 212, program 150 adds the results from ongoing evaluations to CM 154. For example, as EM 152 generates weather forecasting predictions, program 150 updates respective instances of CM 154 with the predictions and any associated classifications or labels. This step is further shown in FIGS. 3A and 3B.

Program 150 applies dynamic cut points to evaluated component models (step 214). In an embodiment, program 150 utilized applied cut points to determine model drift. Program 150 determines whether a component model has drifted by utilizing CM 154 to calculate a plurality of real-time evaluation measures comprising accuracy, precision, sensitivity, and specificity. In an example, for a binary classification domain, accuracy is a ratio of all correct predictions over all predictions (i.e., (True Positive (TP)+ True Negative (TN))/(TP+TN+False Positive (FP)+False Negative (FN)). Continuing, precision is a ratio of true positives over predicted positives (i.e., TP/(TP+FP)). Continuing, sensitivity (i.e., recall) is a ratio of true positive over all positives (i.e., TP/(TP+FN)). Continuing, specificity is a ratio of true negatives over all negatives (i.e., TN/(TN+TP). These continuing examples are further illustrated in FIGS. 3A and 3B.

Responsive to the calculated real-time evaluation measures, program 150 compares said measures (i.e., derived from the respective coincidence matrix) to a determined disable cut point (e.g., possible drift), wherein the disable cut point is an evaluation measure threshold. In an embodiment, if a component model of EM 152 has an evaluation measure lower than the disable cut point, then program 150 does not incorporate (e.g., contribute, associated prediction is not weighed) the prediction from the component model into an ensemble prediction (i.e., combined prediction of the component models comprised within EM 152). Here, the offending component model is not removed from EM 152 and still available for subsequent evaluations. Responsive to a component model offending the disable cut point, program 150 flags said model and said flag can only be removed by future evaluation measures satisfying the disable cut point.

In an embodiment, program 150 utilizes an accumulated time or time percentage (compared with model life) when flagged, as well as flag frequency as parameters for model removal. In an embodiment, program 150 utilizes flag accumulation throughout EM 152 to define an elimination cut point, wherein the elimination cut point is lower than the disable cut point. For example, program 150 sets the elimination cut point based on a flag accumulation value of a number of days a component model is in a flagged set. In another embodiment, program 150 sets the elimination cut point based on number of times a component model has been flagged within a specific time period. For example, program 150 sets the elimination cut point to remove any component model that has been flagged more than 5 times within a week. In this embodiment, any component model with evaluation measures lower than the elimination cut point is removed from EM 152. In an embodiment, program 150 dynamically sets and adjusts the disable and/or elimination cut points based on computational constraints. For example, as available computational resources decrease, program 150 increases the disable and elimination cut points to allow for more component model removals and disables, thus reducing computational requirements of EM 152. In an embodiment, program 150 maintains separate disable and elimination cut points for each type of evaluation measure (i.e., accuracy, precision, sensitivity, specificity, etc.). In another embodiment, program 150 maintains a single disable cut point and a single elimination cut point that considers a weighted aggregation of all evaluation measures. In an embodiment, responsive to a removed component model, program 150 utilizes EM 152 to predict subsequent data points.

Figures 3A, 3B:
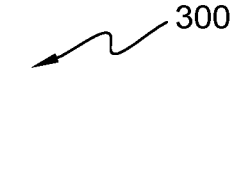
FIGS. 3A and 3B are coincidence matrices, in accordance with an embodiment of the present invention.

FIGS. 3A and 3B illustrate coincidence matrices 300, in accordance with an embodiment of the present invention. Coincidence matrices 300 comprises two coincidence matrices, an originally initialized matrix (i.e., FIG. 3A) and an updated matrix (i.e., FIG. 3B), each with an associated accuracy table. Here, the value "Normal" is mapped to "Positive" and the value "High" is mapped to "Negative". FIG. 3A illustrates and initial coincidence matrix with an initial accuracy of 79% (i.e., TP+TN/TP+TN+FP+FN|(62+96)/(62+96+35+7)). FIG. 3B illustrates a coincidence matrix and associated accuracy after 10 incoming records with an accuracy of 79.5% (i.e., (63+104)/(62+104+35+8)).

FIGS. 4A and 4B illustrate matrix adjustment 400, in accordance with an embodiment of the present invention. Matrix adjustment 400 comprises two tables, each detailing CM 154 adjustments, as detailed in step 210. These tables show that responsive to CM 154 exceeding a threshold as new data and evaluations arrive, program 150 reduces existing records comprised within CM 154 to allow the new data and evaluations. FIG. 4A continues from FIGS. 3A and 3B, with a threshold of 200 records with 10 incoming records. FIG. 4A demonstrates corresponding record adjustments that ensure the threshold (i.e., upper limit constraint) is satisfied. FIG. 4B also continues from FIGS. 3A and 3B, with a threshold of 200 records with 300 incoming records. FIG. 4B demonstrates corresponding adjustments that ensure the threshold is satisfied.

What is claimed is:

1. A computer-implemented method comprising:

creating, by one or more computer processors, a respective coincidence matrix for each component model of a deployed ensemble model;

generating, by one or more computer processors, evaluation measures for each of the component models of the deployed ensemble model, wherein the evaluation measures are based on predictions from respective component models ingesting real-time engine performance data;

responsive to the respective coincidence matrix failing to exceed a record threshold, updating, by one or more computer processors, the respective coincidence matrix with the generated evaluation measures;

responsive to the respective updated coincidence matrix failing to exceed a disable cut point, flagging, by one or more computer processors, the respective component model;

dynamically adjusting, by one or more computer processors, an elimination cut point based on computational constraints associated with the deployed ensemble model; and responsive to the respective updated coincidence matrix associated with the respective flagged component model not exceeding the elimination cut point, removing, by one or more computer processors, the respective flagged component model from the deployed ensemble model.

2. The computer-implemented method of claim 1, further comprising:

responsive to the respective coincidence matrix exceeding the record threshold, adjusting, by one or more computer processors, the respective coincidence matrix by a calculated coincidence ratio.

3. The computer-implemented method of claim 1, wherein flagging the respective component model further comprises:

preventing, by one or more computer processors, the respective flagged component model from contributing to a prediction from the deployed ensemble model.

4. The computer-implemented method of claim 3, wherein the respective flagged component model is subsequently evaluated.

5. The computer-implemented method of claim 1, wherein the elimination cut point is defined by flag accumulation of the respective flagged component models.

6. The computer-implemented method of claim 1, wherein the generated evaluation measures comprise accuracy, precision, sensitivity, and specificity.

7. The computer-implemented method of claim 1, further comprising:

adjusting, by one or more computer processors, the disable cut point and the elimination cut point based on the computational constraints.

8. A computer program product comprising:

one or more computer readable storage media having computer-readable program instructions stored on the one or more computer readable storage media, the program instructions executing a computer-implemented method comprising:

creating a respective coincidence matrix for each component model of a deployed ensemble model;

generating evaluation measures for each of the component models of the deployed ensemble model, wherein the evaluation measures are based on predictions from respective component models ingesting real-time engine performance data;

responsive to the respective coincidence matrix failing to exceed a record threshold, updating the respective coincidence matrix with the generated evaluation measures;

responsive to the respective updated coincidence matrix failing to exceed a disable cut point, flagging the respective component model;

dynamically adjusting an elimination cut point based on computational constraints associated with the deployed ensemble model; and responsive to the respective updated coincidence matrix associated with the respective flagged component model not exceeding the elimination cut point, removing the respective flagged component model from the deployed ensemble model.

9. The computer program product of claim 8, wherein the program instructions, stored on the one or more computer readable storage media further comprises:

responsive to the respective coincidence matrix exceeding the record threshold, adjusting the respective coincidence matrix by a calculated coincidence ratio.

10. The computer program product of claim 8, wherein flagging the respective component model further comprises:

preventing the respective flagged component model from contributing to a prediction from the deployed ensemble model.

11. The computer program product of claim 10, wherein the respective flagged component model is subsequently evaluated.

12. The computer program product of claim 8, wherein the elimination cut point is defined by flag accumulation of the respective flagged component models.

13. The computer program product of claim 8, wherein the generated evaluation measures comprise accuracy, precision, sensitivity, and specificity.

14. The computer program product of claim 8, wherein the program instructions, stored on the one or more computer readable storage media, further comprise:

adjusting the disable cut point and the elimination cut point based on computational constraints.

15. A computer system comprising:

one or more computer processors; and one or more computer readable storage media having computer readable program instructions stored on the one or more computer readable storage media for execution by at least one of the one or more processors, the stored program instructions execute a computer-implemented method comprising:

creating a respective coincidence matrix for each component model of a deployed ensemble model;

generating evaluation measures for each of the component models of the deployed ensemble model, wherein the evaluation measures are based on predictions from respective component models ingesting real-time engine performance data;

responsive to the respective coincidence matrix failing to exceed a record threshold, updating the respective coincidence matrix with the generated evaluation measures;

responsive to the respective updated coincidence matrix failing to exceed a disable cut point, flagging the respective component model;

dynamically adjusting an elimination cut point based on computational constraints associated with the deployed ensemble model; and responsive to the respective updated coincidence matrix associated with the respective flagged component model not exceeding an elimination cut point, removing the respective flagged component model from the deployed ensemble model.

16. The computer system of claim 15, wherein the program instructions stored on the one or more computer readable storage media, further comprise:

responsive to the respective coincidence matrix exceeding the record threshold, adjusting the respective coincidence matrix by a calculated coincidence ratio.

17. The computer system of claim 15, wherein flagging the respective component model further comprises:

preventing the respective flagged component model from contributing to a prediction from the deployed ensemble model.

18. The computer system of claim 17, wherein the respective flagged component model is subsequently evaluated.

19. The computer system of claim 15, wherein the elimination cut point is defined by flag accumulation of the respective flagged component models.

20. The computer system of claim 15, wherein the generated evaluation measures comprise accuracy, precision, sensitivity, and specificity.

* * * * *